(12) United States Patent
Getzin (10) Patent No.: US 10,389,434 B1
(45) Date of Patent: Aug. 20, 2019

(54) BI-DIRECTIONAL DATA ISOLATOR WITH DYNAMIC COMMUNICATION

(71) Applicant: Analog Devices, Inc., Norwood, MA (US)

(72) Inventor: Lawrence Getzin, Concord, NH (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 16/181,895

(22) Filed: Nov. 6, 2018

(51) Int. Cl.
*H04B 5/00* (2006.01)
*H04B 7/24* (2006.01)

(52) U.S. Cl.
CPC ...................... *H04B 7/24* (2013.01)

(58) Field of Classification Search
None
See application file for complete search history.

(56) References Cited

U.S. PATENT DOCUMENTS

| | | | |
|---|---|---|---|
| 7,109,907 B2 * | 9/2006 | Osborne | H04L 25/0266 |
| | | | 341/155 |
| 7,158,573 B2 | 1/2007 | Hershbarger | |
| 7,715,726 B2 * | 5/2010 | Chen | H03M 1/0827 |
| | | | 250/551 |
| 7,724,831 B2 * | 5/2010 | Fukahori | H04L 5/1423 |
| | | | 340/310.17 |
| 7,881,461 B2 | 2/2011 | Skov et al. | |
| 8,049,573 B2 | 11/2011 | Alfano et al. | |
| 8,271,216 B2 | 9/2012 | White et al. | |
| 8,660,489 B2 * | 2/2014 | Barrenscheen | H04B 5/0031 |
| | | | 375/258 |
| 8,873,644 B1 * | 10/2014 | Todsen | H03M 3/368 |
| | | | 341/126 |
| 9,258,032 B2 * | 2/2016 | Barrenscheen | H04B 5/0031 |
| 9,306,614 B2 * | 4/2016 | Ragonese | H03B 5/1228 |
| 9,614,704 B2 * | 4/2017 | Natarajan | H04L 25/49 |
| 9,768,945 B2 * | 9/2017 | Mueck | H04L 7/0016 |
| 9,972,196 B2 * | 5/2018 | Mueck | G08C 15/00 |
| 10,097,338 B1 * | 10/2018 | Ng | H04L 7/0016 |
| 2013/0279611 A1 | 10/2013 | Mueck et al. | |
| 2014/0233614 A1 * | 8/2014 | Crawley | H04B 1/40 |
| | | | 375/219 |

(Continued)

FOREIGN PATENT DOCUMENTS

CN 204168144 U 2/2015

*Primary Examiner* — Tuan A Tran
(74) *Attorney, Agent, or Firm* — Wolf, Greenfield & Sacks, P.C.

(57) ABSTRACT

Data isolators for providing isolation between two ports that enable dynamic communication are described. The dynamic communication may be achieved by varying a ratio of the data rate relative to a clock frequency of a clock signal. The data isolator may include a first circuit that transmits data across an isolation barrier when the clock signal is in a first state and a second circuit that transmits data across the isolation barrier when the clock signal is in a second state. The clock frequency may be variable and, as a result, change the duration of data transmissions in a given clock cycle. For example, the clock frequency may be reduced to increase the number of bits transmitted per clock cycle and, conversely, increased to reduce the number of bits transmitted per clock cycle. Thus, the number of bits transmitted per clock cycle may be adjusted to suit the situation.

20 Claims, 6 Drawing Sheets

(56) References Cited

U.S. PATENT DOCUMENTS

| | | | |
|---|---|---|---|
| 2015/0180528 A1* | 6/2015 | Ragonese | H03B 5/1228 |
| | | | 375/219 |
| 2016/0087780 A1 | 3/2016 | Goswami et al. | |
| 2016/0087914 A1* | 3/2016 | Goswami | H04B 5/0031 |
| | | | 370/442 |
| 2018/0041130 A1* | 2/2018 | Kunz | H02M 3/33523 |
| 2018/0294945 A1* | 10/2018 | Ng | H04L 7/0016 |

* cited by examiner

BI-DIRECTIONAL DATA ISOLATOR WITH DYNAMIC COMMUNICATION

FIELD OF THE DISCLOSURE

The present disclosure relates to bi-directional data isolator configurations that enable dynamic communication.

BACKGROUND

Data isolators may be, for example, electronic devices that are configured to receive data at an input port and provide the data at an output port that is isolated from the input port. Thus, the data isolator may prevent certain disturbances from propagating from the input port to the output port or vice-versa. Data isolators may employ isolation barriers to isolate the input port from the output port. Typically, a data isolator includes a transmitter disposed on one side of an isolation barrier and a receiver disposed on an opposite side of the isolation barrier. The transmitter typically transmits a data signal representative of the information received at the input port across an isolation barrier to the receiver. In turn, the receiver processes the received data signal to recover the information provided to the input port. The actions of the transmitter and the receiver may be coordinated by a clock signal that oscillates between two states at a fixed frequency.

SUMMARY OF THE DISCLOSURE

Data isolators for providing isolation between two ports that enable dynamic communication are described. The dynamic communication may be achieved by varying a ratio of the data rate relative to a clock frequency of a clock signal. The data isolator may include a first circuit that transmits data across an isolation barrier when the clock signal is in a first state and a second circuit that transmits data across the isolation barrier when the clock signal is in a second state. The clock frequency may be variable and, as a result, change the duration of data transmissions in a given clock cycle. For example, the clock frequency may be reduced to increase the number of bits transmitted per clock cycle and, conversely, increased to reduce the number of bits transmitted per clock cycle. Thus, the number of bits transmitted per clock cycle may be adjusted to suit the situation.

According to at least one aspect, a bi-directional data isolator is provided. The data isolator comprises an isolation barrier, a first circuit configured to transmit first data and a clock signal across the isolation barrier, the clock signal being configured to periodically vary between a plurality of states at a clock frequency, and a second circuit configured to receive the first data and the clock signal and transmit second data across the isolation barrier, wherein the first circuit is configured to transmit the first data at a data rate that is variable relative to the clock frequency within a range including a first ratio of the data rate to the clock frequency and a second ratio of the data rate to the clock frequency.

According to at least one aspect, a bi-directional data isolator is provided. The bi-directional data isolator comprises an isolation barrier, a first circuit configured to transmit first data and a clock signal across the isolation barrier, the clock signal being configured to periodically vary between a plurality of states at a clock frequency, and a second circuit configured to receive the first data and the clock signal and transmit second data across the isolation barrier, wherein the first circuit is configured to transmit the first data up to a data rate that is at least four times higher than the clock frequency.

According to at least one aspect, a method of operating a bi-directional data isolator is provided. The method comprises generating a clock signal that periodically varies between a plurality of states at a clock frequency, transmitting, by a first circuit, the clock signal across a transformer in a first direction, transmitting, by the first circuit, first data across the isolation barrier in the first direction at a data rate that is variable relative to the clock frequency within a range including a first ratio of the data rate to the clock frequency and a second ratio of the data rate to the clock frequency, receiving, by a second circuit, the first data and the clock signal transmitted across the isolation barrier in the first direction, and transmitting, by the second circuit, second data across the isolation barrier in a second direction that is different from the first direction.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

According to some aspects, data isolators that enable dynamic communication are provided. A conventional data isolator generally transmits information in a static fashion. For example, a frequency of the clock signal that coordinates the transmitter and receiver may be fixed. Additionally, the number of bits transmitted per clock cycle may also be fixed. The inventors have appreciated that such a conventional approach fails to provide flexibility for handling transmission of data packets of various sizes. For example, a sensor may periodically transmit small pieces of data (e.g., containing less than 4 bits) indicative of a parameter sensed by the sensor through the data isolator and occasionally need to transmit significantly larger pieces of data (e.g., containing more than 6 bits) to send operating status information (e.g., fault codes) through the data isolator. As a result, conventional data isolators may divide the larger pieces of data into multiple smaller packets that can be individually transmitted. Dividing up the data packets in such a manner reduces the speed at which the entire piece of data is transmitted across the isolation barrier and increases the amount of communication overhead required to send the piece of data.

Accordingly, aspects of the present disclosure provide data isolators with dynamic communication schemes that enable data packets of different sizes to be transmitted across the isolation barrier.

In some embodiments, the data isolator may transmit data in a first direction across an isolation barrier (e.g., a capacitive isolation barrier, an optical isolation barrier, and/or an inductive isolation barrier) while a clock signal is in a first state and transmits data in a second, opposite direction across the isolation barrier while the clock signal is in a second state. In these embodiments, the clock signal may have a variable frequency that enables a variable number of bits to be transmitted in each direction across the isolation in a given cycle of the clock signal. For example, the clock frequency may be reduced to increase the amount of time the clock signal spends in each of the first and second states during a given cycle. Thus, the number of bits that may be transmitted while the clock signal is in a given state is increased. Increasing the number of bits in a given clock cycle may advantageously permit larger pieces of data to be transmitted in a fewer number of packets and, as a result, reduce the total amount of time required to transmit the piece of data across the isolation barrier. Conversely, the clock frequency can be increased to reduce the amount of time the clock signal is in a given state and, as a result, reduce the number of bits that may be transmitted while the clock signal in the given state. Reducing the number of bits in a given clock cycle may advantageously permit smaller pieces of data to be transmitted faster across the isolation barrier because the duration of each clock cycle is reduced. Thus, the clock frequency and/or the number of bits transmitted in a given clock cycle may be adjusted to best suit the information to be transmitted across the isolation barrier.

The aspects and embodiments described above, as well as additional aspects and embodiments, are described further below. These aspects and/or embodiments may be used individually, all together, or in any combination of two or more, as the application is not limited in this respect.

Figure 1:
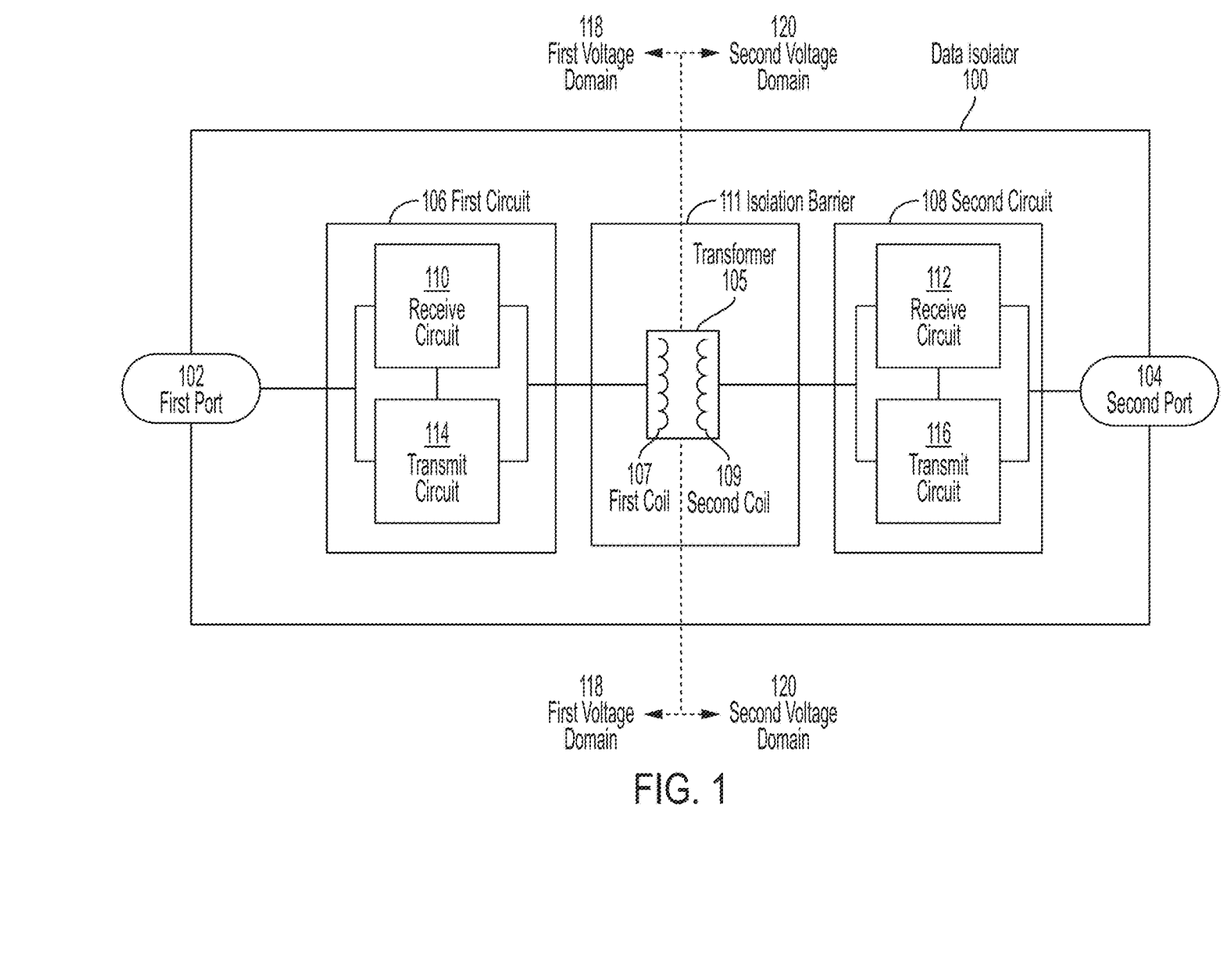
FIG. 1 is a diagram showing an example data isolator, according to some embodiments.

FIG. 1 shows an example data isolator 100, according to some embodiments. The data isolator 100 may provide data isolation between a first port 102 and a second port 104. The first port 102 may be in a first voltage domain 118 while the second port 104 may be in a second voltage domain 120. The first voltage domain 118 may be a different voltage domain from the second voltage domain 120. For example, the voltage domain at the first port 102 may be a lower (or higher) voltage domain than the second voltage domain 120. Alternatively, the first voltage domain 118 may be the same as the second voltage domain 120.

As shown in FIG. 1, the data isolator 100 comprises a first circuit 106 that communicates with a second circuit 108 over an isolation barrier 111 shown as an inductive isolation barrier that comprises transformer 105. The first circuit 106 is coupled between the first port 102 and a first coil 107 of the transformer 105. The second circuit 108 is coupled between the second port 104 and a second coil 109 of the transformer 105. The first circuit 106 may comprise a transmit circuit 114 that enables transmission of data across the isolation barrier 111 in a first direction to the second circuit 108 and a receive circuit 110 that enables receipt of data transmitted by the second circuit 108 across the isolation barrier 111 in a second, opposite direction. The second circuit 108 may comprise a transmit circuit 116 that enables transmission of data across the isolation barrier 111 in the second direction to the first circuit 106 and a receive circuit 112 that enables receipt of data transmitted by the first circuit 106 across the isolation barrier 111 in the first direction. Thus, the first and second circuits 106 and 108, respectively, may operate in concert to enable bi-directional communication between the first port 102 and the second port 104.

The isolation barrier 111 may be configured to isolate the first port 102 from the second port 104. The isolation barrier 111 may comprise one or more isolators such as transformers, optical isolators, and capacitive isolators. For example, the isolation barrier 111 may comprise a single isolator across which the data and the clock signal are transmitted. Alternatively, the isolation barrier may comprise two or more isolators. For example, a first isolator may be employed for transmission of data and a second isolator may be employed for transmission of a clock signal. In another example, a first isolator may be employed for transmission of data and the clock signal in a first direction across the isolation barrier and a second isolator may be employed for transmission of data in a second, opposite direction across the isolation barrier.

The isolation barrier 111 may be implemented, for example, as a capacitive isolation barrier using one or more capacitors, an optical isolation barrier using one or more optical components, and/or as an inductive isolation barrier 111 using one or more transformers. In the particular implementation shown in FIG. 1, the isolation barrier 111 is implemented as an inductive isolation barrier that employs the transformer 105 to provide the isolation. The transformer 105 may be, for example, configured to transfer energy via electromagnetic induction. The transformer 105 may have any of a variety of constructions. For example, the transformer 105 may be constructed as a core type transformer where the windings surround the core, a shell type transformer where the windings are at least partially surrounded by the core, and/or a planar transformer where each of the coils are disposed within a respective 2-dimensional plane. Additionally, the transformer 105 may be a micro-transformer that is implemented within a semiconductor die.

The transmit circuits 114 and 116 may be configured to transmit data across the isolation barrier 111. For example, the transmit circuit 114 may be configured to transmit data across the isolation barrier 111 in a first direction to the receive circuit 112 and the transmit circuit 116 may be configured to transmit data across the isolation barrier 111 in a second direction to receive circuit 110. The data transmitted by each of the transmit circuit 114 and the transmit circuit 116 may be received, for example, via the first port 102 and the second port 104, respectively. One (or both) of the transmit circuits 114 and 116 may transmit a clock signal across the isolation barrier 111 along with the data to coordinate operation of the first and second circuits 106 and 108, respectively. For example, the clock signal may oscillate between a first state where only the transmit circuit 114 is permitted to transmit data across the isolation barrier 111 and a second state where only the transmitter 116 is permitted to transmit data across the isolation barrier 111. Thus, collisions caused by both transmitters 114 and 116 attempting to transmit data simultaneously may be avoided.

The receive circuits 110 and 112 may be configured to receive data transmitted across the isolation barrier 111. For example, the receive circuit 110 may be configured to receive data transmitted across the isolation barrier 111 by transmit circuit 116 and the receive circuit 112 may be configured to receive the data transmitted across the isolation barrier 111 by the transmit circuit 114. The data received by each of receive circuit 110 and receive circuit 112 may be provided to, for example, the first port 102 and the second port 104, respectively. The receive circuits 110 and/or 112 may employ the clock signal transmitted along with the data signal to, for example, identify the source of the data being received. For example, the transmitter 114 may be the source of the received data when the clock signal is in a first state and the transmitter 116 may be the source of the received data when the clock signal is in a second state. Additionally (or alternatively), one or both of the receive circuits 110 and 112 may output the clock signal along with the received data. Thus, the clock signal may be employed by external device(s) coupled to the first port 102 and/or the second port 104.

In some embodiments, the transmit circuits 114 and 116 may be configured to transmit data in a dynamic fashion to enable data packets of different sizes to be transmitted across the isolation barrier 111. Such a transmission scheme may be accomplished by, for example, varying a frequency of the clock signal. Thus, the amount of time the clock signal spends in a given state is variable and the number of data bits that may be transmitted in a clock cycle are variable. For example, the clock frequency may nominally be approximately 1 megahertz and eight bits may be transmitted per clock cycle. In this example, the clock frequency may be reduced (e.g., to 500 kilohertz) to enable up to sixteen bits to be transmitted per clock cycle. Conversely, the clock frequency may be increased (e.g., to 2 megahertz) to enable up to 4 bits to be transmitted per clock cycle. It should be appreciated that the particular range of clock frequencies and the associated range of bits that may be transmitted per clock cycle may vary based on the particular implementation. In some embodiments, the minimum clock frequency may be no more than 500 kilohertz (e.g., 400 kilohertz, 300 kilohertz, 200 kilohertz, 100 kilohertz, 50 kilohertz, 10 kilohertz, etc.) and the maximum clock frequency may be at least 1 megahertz (e.g., 2 megahertz, 4 megahertz, 8 megahertz, 10 megahertz etc.). Particular non-limiting example ranges for the clock frequency include: (1) 500 kilohertz to 4 Megahertz; (2) 500 kilohertz to 8 Megahertz; (3) 250 kilohertz to 4 Megahertz; and (4) 250 kilohertz to 8 Megahertz. In some embodiments, the number of bits transmitted per clock cycle may vary within a range with a minimum number of bits that is no more than 2 (e.g., 1 bit, 0.5 bits, etc.) and a maximum number of bits that is at least 4 (e.g., 5 bits, 6, bits, 7 bits, 8 bits, etc.). Particular non-liming example ranges for the number of bits to be transmitted per clock cycle include: (1) 1 bits to 10 bits; (2) 2 bits to 8 bits; and (3) 2 bits to 8 bits. As a result of the variable clock frequency and the variable number of bits transmitter per clock cycle, the ratio of the data rate to the clock frequency may also vary within a range. In some embodiments, the ratio of the data rate to the clock frequency may have a minimum ratio of no more than 1:1 (e.g., the data rate in bits per second equals the clock frequency in hertz) and a maximum ratio of at least 4:1 (e.g., the data rate in bits per second is four times larger than the clock frequency in hertz). Particular non-liming example ranges for the ratio include: (1) 1:1 to 4:1; (2) 1:2 to 8:1; and (3) 1:1 to 8:1.

Figure 2:
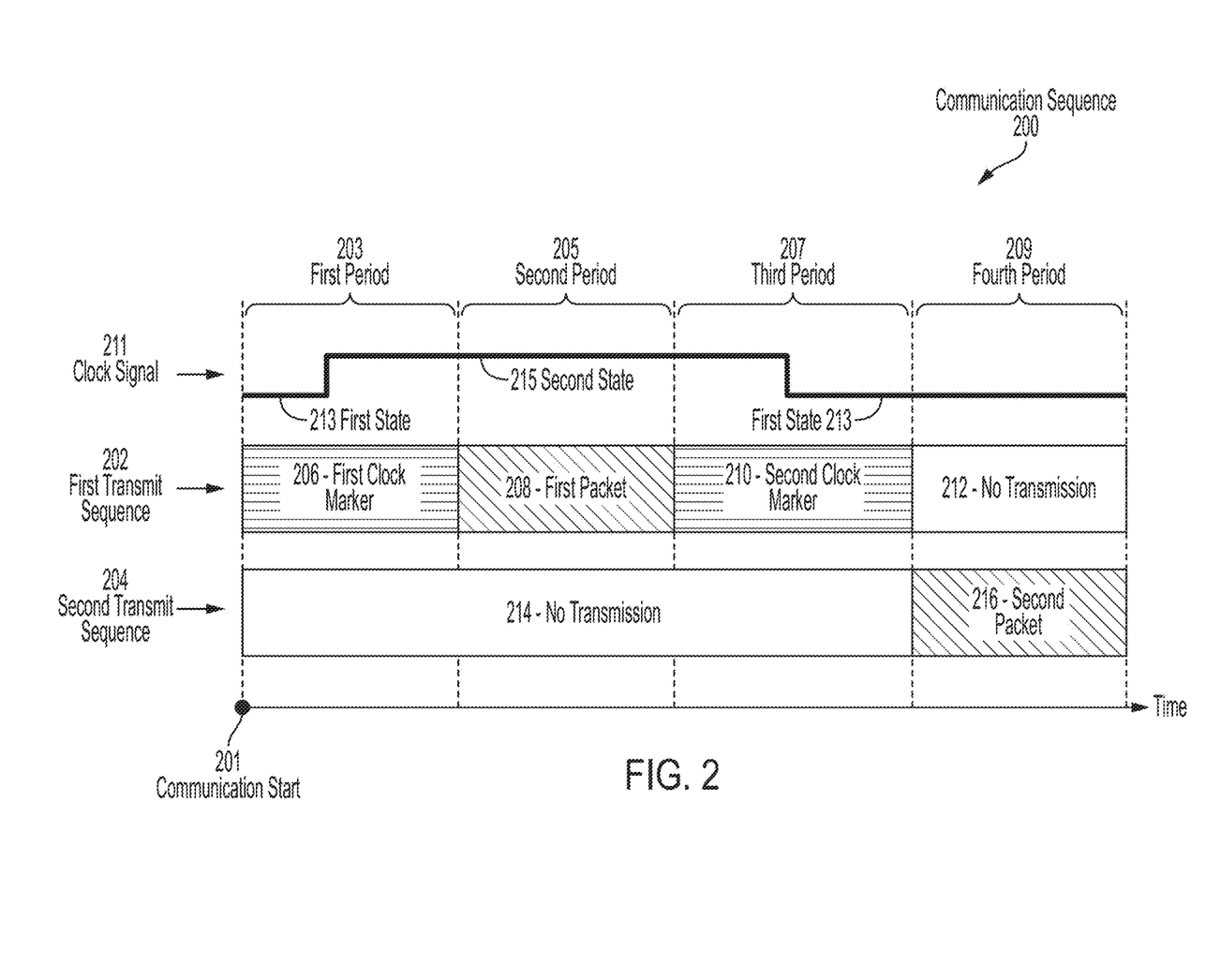
FIG. 2 is a diagram showing an example communication sequence, according to some embodiments.

Referring to FIG. 2, an example communication sequence 200 is depicted that may be employed to achieve dynamic data transmission. As shown, the communication sequence 200 includes a first circuit transmit sequence 202 that may be transmitted by transmit circuit 114, a second transmit sequence 204 that may be transmitted by transmit circuit 116, and a clock signal 211 that varies between a first state 213 and a second state 215. The first transmit sequence 202 comprises a first clock marker 206, a first packet 208, a second clock marker 210, and a no transmission period 212. The second transmit sequence 204 comprises a no transmission period 214 and a second packet 216. The communication sequence 200 starts at a communication start 201 and is divided into four periods shown as first, second, third, and fourth periods 203, 205, 207, and 209, respectively.

During the first period 203, the transmit circuit 114 transmits the first clock marker 206 while the transmit circuit 116 is in no transmission period 214 (e.g., transmit circuit 116 is idle). The first clock marker 206 may be a signal that is representative of a transition in the clock signal 211 between the first state 213 and the second state 215. For example, the first clock marker 206 may be a unique sequence of one or more pulses, such as a sequence of three pulses having a sequence of polarities that is positive-negative-positive.

During the second period 205, the transmit circuit 114 transmits a first packet 208 while the transmit circuit 116 is in the no transmission period 214. The first packet 208 may include data that is being transmitted between the first and second ports 102 and 104, respectively. The first packet 208 may comprise, for example, a sequence of pulses each representative of a state of a bit being transmitted. The size of the first packet 208 may vary based on the duration of the second period 205. As the duration of the second period 205 increases, more bits may be transmitted in the first packet 208. Conversely, the size of the first packet 208 may be reduced as the duration of the second period 205 is decreased.

During the third period 207, the transmit circuit 114 transmits a second clock marker 210 while the transmit circuit 116 is in the no transmission period 214. The second clock marker 210 may be a signal that is representative of a transition in the clock signal 211 between the second state 215 back to the first state 213. For example, the second clock marker 206 may be a unique sequence of one or more pulses, such as a sequence of three pulses having a sequence of polarities that is negative-positive-negative.

During the fourth period 209, the transmit circuit 116 transmits the second packet 216 while the transmit circuit 114 is in no transmission period 212 (e.g., transmit circuit 116 is idle). The second packet 216 may include data that is being transmitted between the first and second ports 102 and 104, respectively. The second packet 216 may comprise, for example, a sequence of pulses each representative of a state of a bit being transmitted. The size of the second packet 216 may vary based on the duration of the fourth period 209. As the duration of the fourth period 209 increases, more bits may be transmitted in the second packet 216. Conversely, the size of the second packet 216 may be reduced as the duration of the fourth period 209 is decreased.

Once the fourth period 209 has ended, the communication sequence 200 may repeat until the communication is complete. For example, the transmitters 114 and 116 may repeat the first transmit sequence 202 and the second transmit sequence 204, respectively. The communication sequence 200 may be repeated any number of times depending on the amount of data to be transmitted over the isolation barrier.

Returning to FIG. 1, it should be appreciated that the data isolator 100 may be implemented using any number of semiconductor dies integrated into any number of circuit packages. For example, the data isolator 100 may be implemented in a single semiconductor die that may be integrated into a circuit package. In another example, the components of the data isolator 100 may be distributed into a plurality of semiconductor dies that may be electrically connected. The plurality of dies may be integrated into a single circuit package or multiple circuit packages. In addition, other circuits configured to perform additional operations may be integrated into the data isolator 100 without departing from the scope of the present disclosure. For example, a power isolator may be integrated with the data isolator 100 to provide a combined power and data isolator. Such a combined power and data isolator may be integrated into a single circuit package or divided into multiple separate packages.

Figure 3:
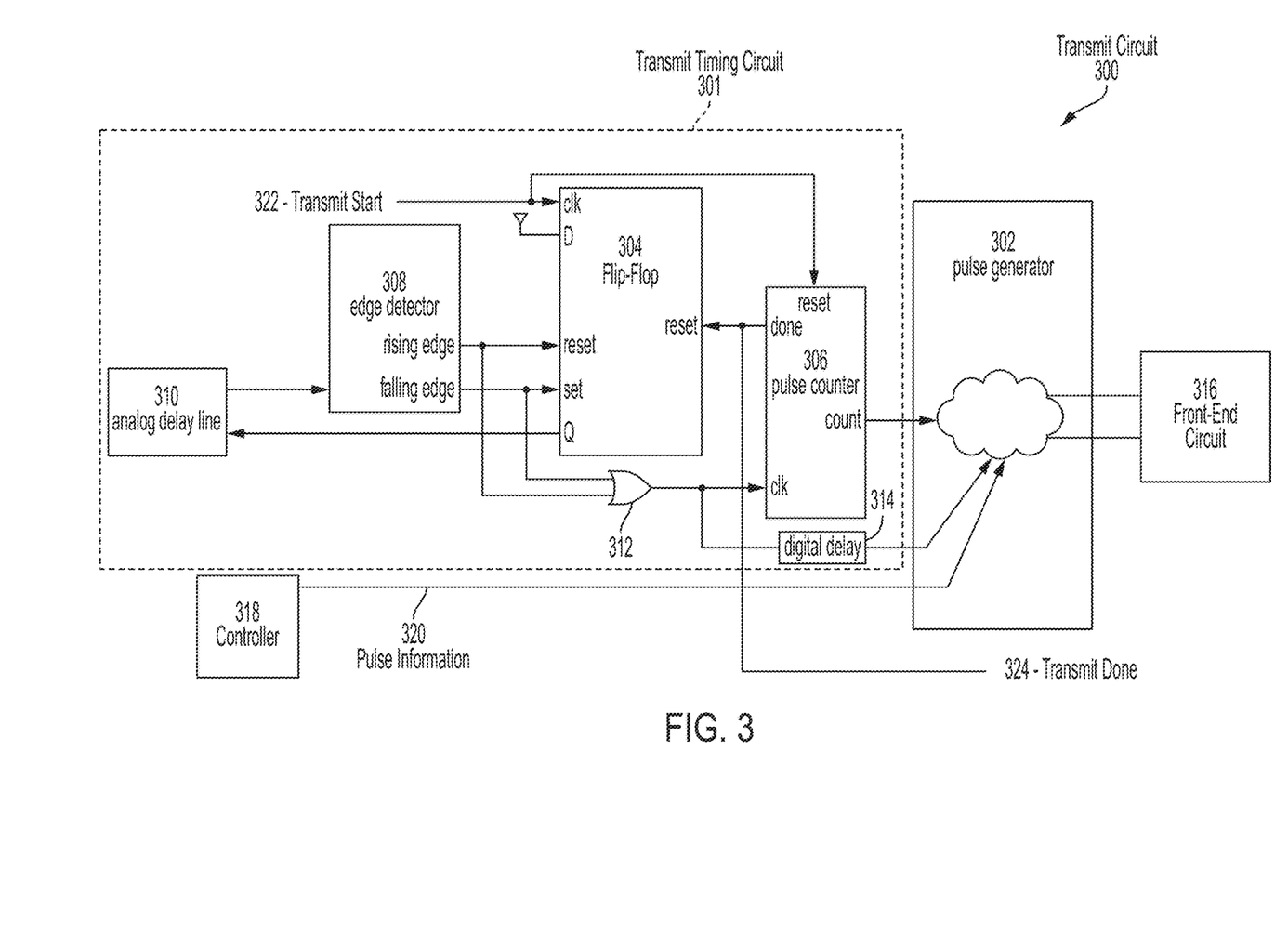
FIG. 3 is a circuit diagram showing a non-limiting example implementation of the transmit circuit in the data isolator of FIG. 1, according to some embodiments.

FIG. 3 shows an example transmit circuit 300 that may be employed as, for example, transmit circuits 114 and/or 116 in data isolator 100. The transmit circuit 300 includes a controller 318 that generates pulse information 320 based on the information that is to be transmitted across the isolation barrier. The pulse information 320 may include the information regarding how a transmission should be performed, such as the number and/or polarity of the pulses in the transmission. The pulse information 320 may be received by a pulse generator 302 that employs the pulse information to generate output pulses that may be converted into analog signals by a front-end circuit 316 before being transmitted across the isolation barrier. The timing of the transmission of the pulses by the pulse generate 302 may be controlled by a transmit timing circuit 301. For example, the transmit timing circuit 301 may identify the appropriate time for the pulse generator 302 to transmit pulses, monitor a number of pulses that have been transmitted, and/or determine the duration of the pulses.

The controller 318 may be configured to generate the pulse information 320 based on the information that is to be transmitted across the isolation barrier (e.g., information received from a device external to the data isolator). The controller 318 may generate a series of data packets that are to be transmitted across the isolation barrier based on the received information. The particular techniques employed by the controller 318 to packetize the data may vary based on the particular data to be transmitted and/or the particular packetization scheme employed by the data isolator. Once the data packets have been generated, the controller 318 may identify a sequence of pulses that correspond to the data packet and/or a clock signal that may accompany the data packet. For example, the controller 318 may identify the number of pulses to be transmitted in the sequence and the polarity of each pulse in the sequence. The identified number of pulses and the sequence of pulses may, in turn, be provided as pulse information 320 to the pulse generator 302.

The transmit timing circuit 301 may be configured to generate timing information for the pulse generator 302. The transmit timing circuit 301 may start when a transmit start signal 322 is a logic high. The transmit start signal 322 may be received from, for example, a receive circuit (e.g., receive circuit 300 in FIG. 3) that is located on the same side of the isolation barrier. The logic high on the transmit start signal 322 triggers a D flip flop 304 to output a logic high at the output Q because the D-input to the D flip flop 304 also receives a logic high (e.g., is coupled to a supply voltage). In turn, the output of the D flip flop 304 is provided to an analog delay line 310 that provides an output that is a delayed version of the input. The analog delay line 310 may be implemented using analog components to advantageously provide a more precise delay than digital components. The output of the analog delay line 310 may be provided to an edge detector 308 that identifies rising and falling edges in the output of the analog delay line 310. When the edge detector 308 detects a rising edge, a logic high is provided to the reset input of the D-flip flop 304 that triggers the output Q of the D-flip flop 304 to go to a logic low. Conversely, when the edge detector 308 detects a falling edge, a logic high is provided to the set input of the D-flip flop 304 that triggers the output Q of the D-flip flop 304 to return to a logic high. As a result, the D-flip flop 304 in combination with analog delay line 310 and edge detector 308 form a self-generated clock that has a frequency equal to the inverse of double the delay time of the analog delay line 310. The rising and falling edges detected by the edge detector 308 are provided to an OR-gate 312. In turn, the output of the OR-gate 312 is provided to the pulse generator 302 via a digital delay 314 to trigger the transmission of pulses. In addition, a pulse counter 306 counts the number of logic highs in the output of the OR-gate 312 that is indicative of the number of pulses output by the pulse generator 302. Once the transmission is complete, the transmission start signal 322 becomes a logic low and triggers the pulse counter 306 to reset the pulse count and a generate a transmit done signal 324 that is a logic high. Additionally, the self-generated clock formed by the D-flip flop 304, the analog delay line 310, and the edge detector 308 may also be stopped.

The pulse generator 302 may be configured to output pulses to the front-end circuit 316 based on the pulse information 320 received from the controller and the timing information received from the transmit timing circuit 301. For example, the timing information may include a trigger signal to send a pulse and a total number of pulses transmitted and the pulse information may include the total number of pulses to be transmitted and the polarity of each pulse. In this example, the pulse generator may transmit a pulse with a polarity as specified by the pulse information each time a trigger signal is received until the total number of pulses transmitted equals the total number of pulses to be transmitted. Once the total number of pulses transmitted equals the total number of pulses to be transmitted the pulse generator 302 may stop sending pulses.

The front-end circuit 316 may be configured to convert the pulses received from the pulse generator 302 into analog signals that may be transmitted across the isolation barrier. The front-end circuit 316 may include any of a variety of components including, for example, digital-to-analog converts (DACs), filters, and/or amplifiers.

Figure 4:
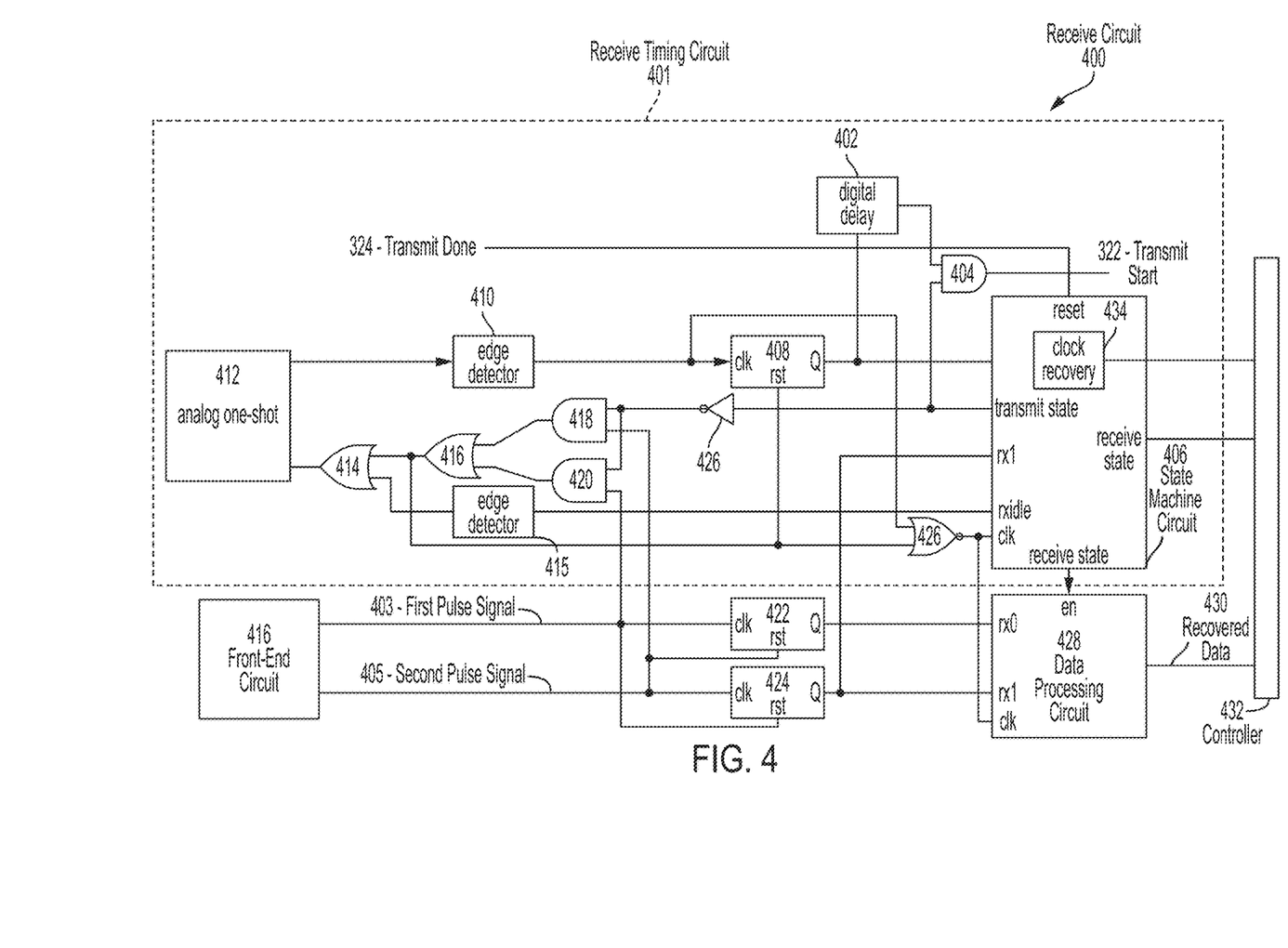
FIG. 4 is a circuit diagram showing a non-limiting example implementation of the receive circuit in the data isolator of FIG. 1, according to some embodiments.

FIG. 4 shows an example receive circuit 400 that may be employed as, for example, receive circuits 110 and/or 112 in data isolator 100. The receive circuit 400 includes a front-end circuit 416 to digitize signals from the isolation barrier and output first and second received pulse signals 403 and 405, respectively. A receive timing circuit 401 may monitor a receive state indicative of whether the receive circuit 400 should process the first and second pulse signals 403 and 405, respectively. A pair of flip flops 422 and 424 may be coupled between the front-end circuit 416 and the data processing circuit 428. The flip flops 422 and 424 may sample and maintain a state of the pulses output by the front-end circuit 416. For example, the pulses output by the front-end circuit 416 may have a short duration and the flip flops 422 and 424 may provide output pulses to the data processing circuit 428 that have a longer duration than the short pulses output by the front-end circuit 416. The data processing circuit 428 may analyze the received pulses to generate recovered data 430 that may be provided to a controller 432. The controller 432 may, in turn, provide the recovered data 430 to a port of the data isolator.

The front-end circuit 416 may be configured to convert the analog signals received from the isolation barrier into digital signals shown as first and second pulse signals 403 and 405, respectively. The first pulse signal 403 may be a logic high when a first signal is received across the isolation barrier (e.g., associated with a 0 being transmitted) and the second pulse signal 405 may be a logic high when a second, different signal is received across the isolation barrier (e.g., associated with a 1 being transmitted). The front-end circuit 416 may include any of a variety of components including, for example, analog-to-digital converters (ADCs), filters, and/or amplifiers.

The receive timing circuit 401 may be configured to monitor a receive state indicative of whether the receive circuit 400 is in a receive state where the received information from the front-end circuit 416 should be processed or a transmit state where the received information from the front-end circuit 416 should be ignored. In the receive timing circuit 401, the state machine circuit 406 receives a transmit done signal 324 from a transmit circuit (e.g., transmit circuit 300) on the same side of the isolation barrier indicating that the last transmission is complete. In turn, the state machine circuit 406 outputs a logic high signal at the receive state ports that trigger the data processing circuit 428 to process the logic states output by the flip flops 422 and 424. Further, the transmit state port of the state machine circuit 406 outputs a logic low signal that, via inverter 426, provides a logic high to a first port of AND gates 418 and 420. The second input of each of the AND gates 418 and 420 receives the first pulse signal 403 and the second pulse signal 405, respectively. Thus, the output of the AND gates 418 and 420 may track the first pulse signal 403 and the second pulse signal 405, respectively. The output of the AND gates 418 and 420 is provided to an OR gate 416 that outputs an indication of whether a pulse has been received. The output of the OR gate 416 is provided to OR gate 414 that is, in turn, provided to an analog one-shot circuit 412. The analog one-shot circuit 412 may be configured to monitor an amount of time that has passed since a pulse signal was last received. If the amount of time between received pulses exceeds a threshold, the analog one-shot circuit 412 times-out and provides a logic high signal. The analog one-shot circuit 412 may be implemented using analog components to advantageously provide a more precise time threshold before timing-out relative to employing digital components. The logic high signal output by the analog one-shot 412 may trigger the receive timing circuit 401 to transition from a receive state to a transmit state. As a result, the number of pulses that may be received and processed is arbitrary because the receive circuit 400 does not transition from a receive state to a transmit state until a threshold amount of time has passed since a pulse has been transmitted.

In some embodiments, the state machine circuit 406 may output an rxidle signal indicative of whether pulses are expected to be received or not expected to be received. The rxidle signal may be output to an edge detector 415 that detects edges in the rxidle signal and provides an output, indicative of whether an edge was detected, to the OR gate 414. The state of the rxidle signal may be controlled so as to block spurious pulses from being detected to increase the robustness of the receive circuit 400. For example, the rxidle signal may be triggered to mask the output of the OR gate 416 when no received signals are expected so as to stop spurious pulses from being processed by the receive circuit 400.

The timing circuit 401 may monitor the output of the analog one-shot using an edge detector 410 that outputs a logic high in response to detecting a rising edge in the signal output by the analog one-shot 412. The logic high output by the edge detector 410 triggers a flip-flop 408 to transition from providing a logic low at the output Q to providing a logic high. The logic high output by the flip-flop 408 is provided to the state machine circuit 406 that may trigger the state machine circuit 406 to output a logic high at the transmit state port to stop the first and second pulse signals 403 and 405 from being propagated to the analog one-shot 412. Further, the state machine circuit 406 may output a logic low at the receive state port to stop the data processing circuit 428 from processing the outputs of the flip-flops 422 and 424. The output (Q) of the flip-flop 408 may also be provided to a digital delay 402 before being provided to an AND gate 404. The output of the AND gate 404 may be the transmit start signal 322 that may be provided to the transmitter (e.g., the transmitter 300 shown in FIG. 3) on the same side of the isolation barrier. Thus, the digital delay 402 may add a time delay between when the transmission over the isolation barrier in a first direction is complete and when the transmission over the isolation barrier in a second, opposite direction starts.

In some embodiments, the state machine circuit 406 may comprise a clock recovery circuit 434 that is configured to recover the clock signal from the first and second pulse signals 403 and 405, respectively. In these embodiments, the state machine circuit 406 may be coupled to the output of one or more of the flip-flops 422 and/or 424 and monitor the outputs of the flip-flops 422 and/or 424 to locate the transmitted clock markers that denote transitions in the clock signal. The recovered clock signal may be output to the controller 432 that may be, for example, output by the data isolator to an external electronic device to facilitate control of one or more components within the external electronic device.

The data processing circuit 428 may be configured to recover the transmitted data packet (e.g., recover the total number of bits in the data packet and the value of each bit) based on the output of the flip-flops 422 and 424 when the receive circuit 400 is in a receive state (as opposed to a transmit state). For example, the data processing circuit 428 may monitor the output of the flip-flops 422 and 424 to determine the state of a given bit in the data packet. In this example, data processing circuit 428 may identify a sequence of low-to-high-to-low transitions in the output of the flip flop 422 as a 0 in the data packet and identify a sequence of low-to-high-to-low transitions in the output of the flip flop 424 as a 1 in the data packet. The data processing circuit 428 may provide the recovered data packet to a controller 432 that may, in turn, provide the recovered data packet to an output of the data isolator (e.g., alone or in combination with other information such as additional recovered data packets).

The controller 432 may provide information to an output of the data isolator based on the recovered data 430 and/or the recovered clock signal. For example, the controller 432 may stitch together data from multiple data packets into a single piece of data before providing the data to the output. The particular way in which information from multiple data packets is combined may depend on the particular packetization scheme employed by the data isolator. Additionally, the controller 432 may output the recovered clock signal to a port of the data isolator such that the clock signal may be employed by an external device (e.g., to control one or more components within the external device).

Figure 5:
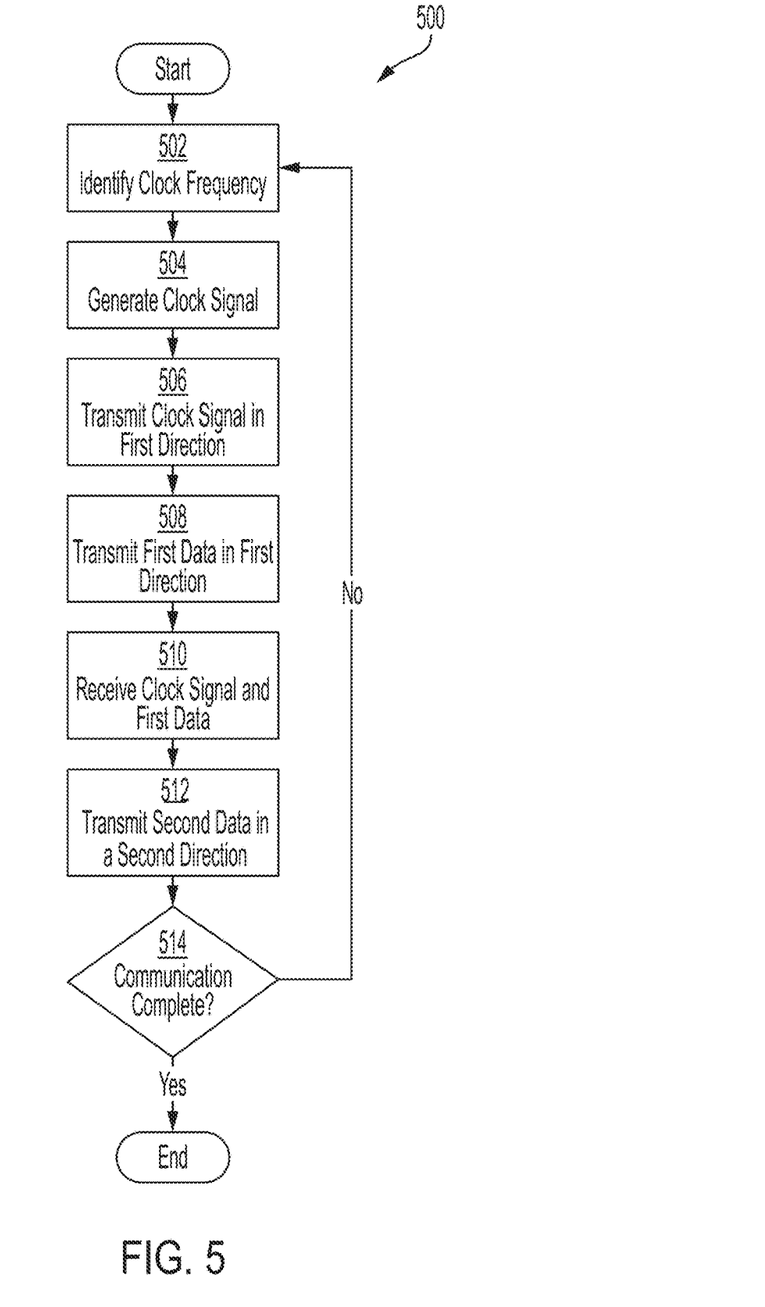
FIG. 5 is a flowchart showing an example method of operating a data isolator, according to some embodiments.

As discussed above, a data isolator is disclosed herein that may be configured to enable bi-directional communication in a dynamic fashion. These data isolators may perform various processes to, for example, enable the bi-directional communication. An example of such a process to operate the data isolator to enable bi-directional communication is shown in FIG. 5 by process 500. The process 500 includes an act 502 of identifying a clock frequency, act 504 of generating a clock signal, an act 506 of transmitting the clock signal, an act 508 of transmitting first data in a first direction across an isolation barrier, an act 510 of receiving the first data and the clock signal, an act 512 of transmitting second data in a second direction across the isolation barrier, and an act 514 of determining whether communication is complete.

In act 502, the data isolator may identify a clock frequency to employ for the data transmission (or any portion thereof). The clock frequency may be variable within a range of frequencies to change a number of bits that are transmitted while the clock signal is in a given state. For example, the clock frequency may be reduced to enable a greater number of bits to be transmitted while the clock signal is in a given state. Conversely, the clock frequency may be increased to reduce the number of bits that may be transmitted while the clock signal is in a given state. Accordingly, the data isolator may increase the clock frequency to transmit data packets that are smaller in size (e.g., sensor values) at a low latency or reduce the clock frequency to transmit larger data packets (e.g., error messages). As a result, the data isolator may select the clock frequency based on the data being transmitted.

In act 504, the data isolator may generate a clock signal at the identified clock frequency. The clock signal may be employed by the data isolator to coordinate operation of multiple components (e.g., transmitter circuits and/or receiver circuits). For example, the data isolator may transmit data in a first direction across the isolation barrier while the clock signal is in a first state and transmit data in a second, opposite direction across the isolation barrier when the clock signal is in a second state.

In act 506, the data isolator may transmit the clock signal in a first direction across the isolation barrier. The data isolator may transmit the clock signal by transmitting clock markers that indicate when transitions occur in the clock signal. The clock markers may be, for example, a unique sequence of pulses representative of either a rising edge in the clock signal or a falling edge in the clock signal.

In act 508, the data isolator may transmit first data in the first direction across the isolation barrier. The first data may, for example, originate from a device coupled the data isolator. The data isolator may transmit the first data in response to the clock signal being in a particular state. For example, the clock signal may oscillate between two states and the data isolator may transmit the first data response to the clock signal being in the first state. Otherwise, the data isolator may wait to transmit the first data until the state of the clock signal changes. The data isolator may transmit the first data as a sequence of pulses. Each of the pulses may be, for example, representative of a state of at least one bit in the first data. It should be appreciated that other signal shapes separate and apart from pulses may be employed to transmit the data.

In act 510, the data isolator may receive the clock signal and the first data. The data isolator may receive the clock signal by, for example, identifying the clock markers transmitted across the isolation barrier and recovering the clock signal based on the identified clock markers. Similarly, the data isolator may receive the first data by, for example, identifying the pulses transmitted over the isolator barrier and reconstructing the first data based on the identified pulses.

In act 512, the data isolator may transmit second data in a second direction across isolation barrier that is opposite the first direction. The second data may, for example, originate from a device coupled the data isolator. The data isolator may transmit the second data in response to the clock signal being in a particular state. For example, the clock signal may oscillate between two states and the data isolator may transmit the first data response to the clock signal being in a second state. Otherwise, the data isolator may wait to transmit the second data until the state of the clock signal changes. The data isolator may transmit the second data as a sequence of pulses. Each of the pulses may be, for example, representative of a state of at least one bit in the second data. It should be appreciated that other signal shapes separate and apart from pulses may be employed to transmit the data.

In act 514, the data isolator may determine whether the communication is complete. The data isolator may determine that communication is complete when there is no more data to transfer across the isolation barrier (e.g., in either direction). If the data isolator determines that communication is not complete, the data isolator may return to act 502 to identify a new clock frequency for the next transmission. Otherwise, process 500 may end.

Figure 6:
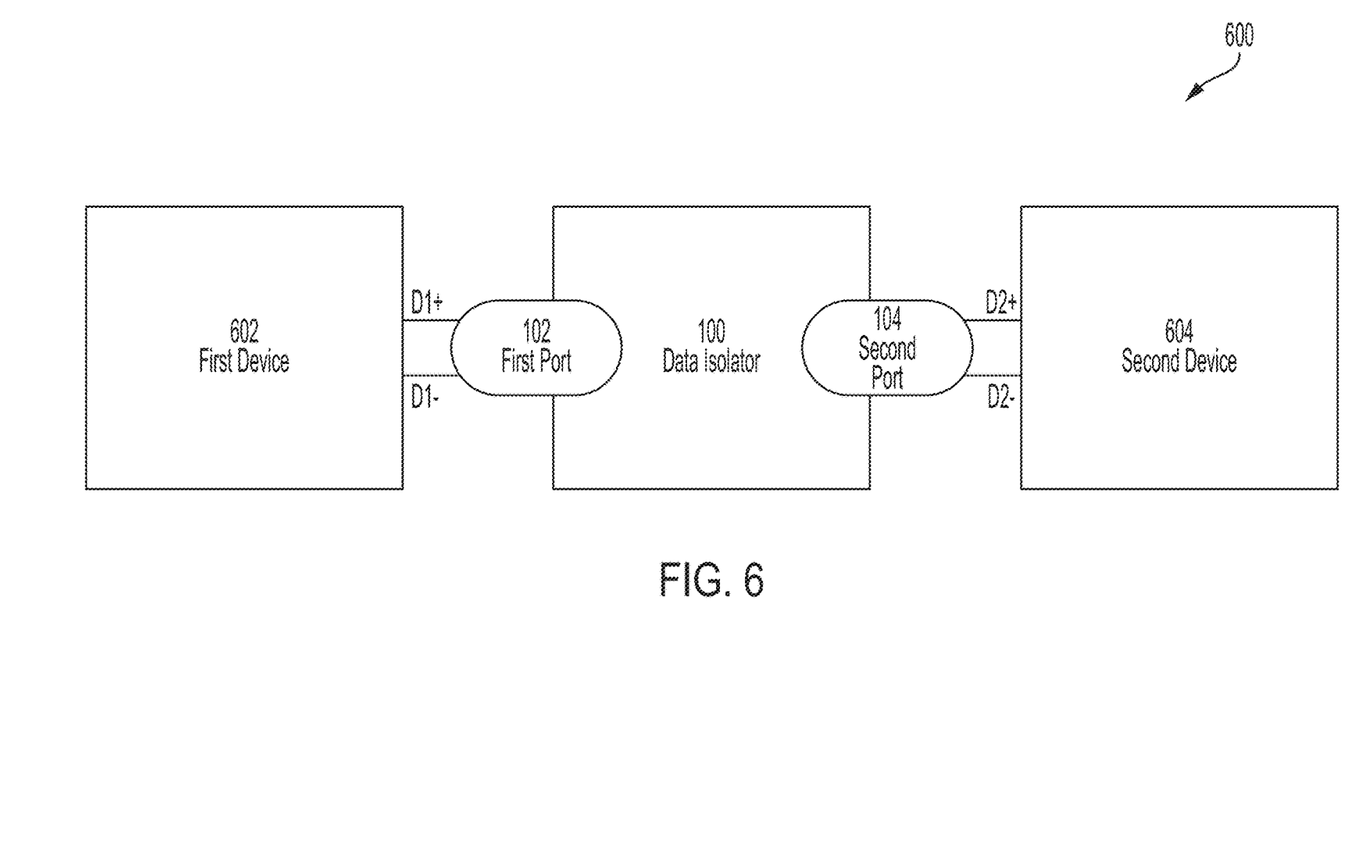
FIG. 6 is a block diagram illustrating a system comprising the data isolator of FIG. 1, according to some non-limiting embodiments.

FIG. 6 is a block diagram illustrating an example of a system 600 comprising the data isolator 100 described above. As shown, the system 600 includes a first device 602 coupled the first port 102 of the data isolator 100 and a second device 604 coupled to the second port 104 of the data isolator 100. The data isolator 100 may provide, for example, data isolation between the first device 602 and the second device 604. The first device 602 and the second device 604 may be in the same voltage domain or different voltage domains.

The first device 602 may be configured to provide data to (and/or receive data from) the first port 102. The first device 602 may be configured to output (and/or receive) the data at a first voltage level. The voltage output (and/or received) by the first device 602 is shown as a data voltage D1+ and reference potential D1− and the first voltage level may be the potential difference between D1+ and D1−.

The second device 604 may be configured to receive data from (and/or provide data to) the second port 104. The second device 604 may be configured to receive (and/or output) the data at a second voltage level. The voltage received (and/or output) by the first device 602 is shown as a data voltage D2+ and reference potential D2− and the second voltage level may be the potential difference between D2+ and D2−.

In some embodiments, the first device 602 may be in a different voltage domain than the second device 604. In these embodiments, the second voltage level may be different from the first voltage level (e.g., smaller or larger than the first voltage level). For example, the potential difference between D2+ and D2− may not be the same as the difference between D1+ and D1−. Additionally (or alternatively), the first voltage level may be offset relative to the second voltage level. For example, the potential at D1− may not match the potential at D2− (irrespective of whether the potential difference between D1+ and D1− matches the potential difference between D2+ and D2−). The data isolator 100 may be configured to support a substantial offset between the first and second voltage levels including, for example, a potential difference between D1− and D2− of at least 250 Volts, 500 Volts, 650 Volts, and/or 1000 Volts.

In some embodiments, the first device 602 may be in the same voltage domain as the second device 604. In these embodiments, the first voltage level may be the same as the second voltage level. For example, the potential difference between D2+ and D2− may be the same as the difference between D1+ and D1−. Additionally, there may be no offset between the first and second voltage levels. For example, the potential at D1− may match the potential at D2−.

Having described bi-directional isolators with dynamic data transmission, it should be appreciated that the information transmitted across the isolation barrier may be arranged in any of a variety of packet structures. In some embodiments, the communication scheme uses an asymmetric packet structure where the structure of the data packet being transmitted in a first direction across the isolation barrier is different from the structure of the data packet being transmitted in a second, opposite direction across the isolation barrier. An example of such an asymmetric packet structure that may be employed to transmit data across the isolation barrier is shown below in Tables 1 and 2. Table 1 shows the data fields for the bits in each data pack in the sequence of 10 data packets transmitted in a first direction across the isolation barrier. Similarly, Table 2 shows the data fields for the bits in each data packet in the sequence of 10 data packets transmitted in a second direction across the isolation barrier. One data packet from each of Tables 1 and 2 may be transmitted per clock cycle. For example, data packet 1 from Table 1 may be transmitted in the first direction over the isolation barrier during the first half of a clock cycle and data packet 1 from Table 2 may be transmitted in the second direction over the isolation barrier. As a result, the sequence of 10 data packets in each of Tables 1 and 2 may be transmitted over 10 clock cycles.

TABLE 1

Example Packetization Scheme for Transmitting Data in a First Direction Across Isolation Barrier

| Bit # | Data Packet Number | | | | | | | | | |
|---|---|---|---|---|---|---|---|---|---|---|
| | 1 | 2 | 3 | 4 | 5 | 6 | 7 | 8 | 9 | 10 |
| 1 | db[0] | db[1] | db[2] | db[3] | db[4] | db[5] | db[6] | db[7] | db[8] | db[9] |
| 2 | crc[4] | db[10] | db[11] | db[12] | sp[0] | sp[1] | crc[0] | crc[1] | crc[2] | crc[3] |

As shown in Table 1, each of the 10 data packets includes two bits. The data bits being transmitted across the isolation barrier in a first direction are shown as db[0]-db[12] in Table 1. The data bits may, for example, include information to control a digital-to-analog converter (DAC) on a second side of the isolation barrier (e.g., a DAC integrated into the second circuit 108). Additionally, the data packet structure shown in Table 1 may include one or more spare bits (shown as sp[0] and sp[1]). The spare bits may have predetermined states that may be employed as a synchronization sequence by the receiver. Alternatively, the one or more spare bits may be removed altogether and replaced with additional data bits. Error detection and/or error correction codes may also be integrated into the data packets to improve noise immunity. The error detection and/or correction codes may be, for example, cyclic redundancy check (CRC) codes (shown as crc[0] through crc[4] in Table 1) and/or error correction codes (ECC) codes.

TABLE 2

Example Packetization Scheme for Transmitting Data in a Second, Opposite Direction Across Isolation Barrier

| Bit # | Data Packet Number | | | | | | | | | |
|---|---|---|---|---|---|---|---|---|---|---|
| | 1 | 2 | 3 | 4 | 5 | 6 | 7 | 8 | 9 | 10 |
| 1 | pwr[9] | pwr[8] | pwr[7] | pwr[6] | pwr[5] | pwr[4] | pwr[3] | pwr[2] | pwr[1] | pwr[0] |
| 2 | db[7] | db[6] | db[5] | db[4] | db[3] | db[2] | db[1] | db[0] | ecc[6] | ecc[5] |
| 3 | stat[7] | stat[6] | stat[5] | stat[4] | stat[3] | stat[2] | stat[1] | stat[0] | ecc[4] | ecc[3] |
| 4 | crc[7] | crc[6] | crc[5] | crc[4] | crc[3] | crc[2] | crc[1] | crc[0] | ecc[2] | ecc[1] |
| 5 | sp[0] | sp[1] | sp[2] | sp[3] | sp[4] | sp[5] | stat[10] | stat[9] | stat[8] | ecc[0] |

As shown in Table 2, each of the 10 data packets includes five bits. The data bits being transmitted across the isolation barrier in a second direction are shown as db[0]-db[7] in Table 2. The data bits may, for example, include information to control an analog-to-digital converter (ADC) on a first side of the isolation barrier (e.g., an ADC integrated into the first circuit 106). Information regarding the state of the circuitry on the first side of the isolation barrier may be transmitted across the isolation barrier in the second direction as status bits stat[0]-stat[10]. Additionally, the data packet structure shown in Table 2 may include one or more spare bits (shown as sp[0] and sp[5]). The spare bits may have predetermined states that may be employed as a synchronization sequence by the receiver. Alternatively, the one or more spare bits may be removed altogether and replaced with additional data bits. Error detection and/or error correction codes may also be integrated into the data packets to improve noise immunity. The error detection and/or correction codes may be, for example, cyclic redundancy check (CRC) codes (shown as crc[0] through crc[7]) and/or error correction codes (ECC) codes (shown as ecc[0]-ecc[6]).

In some embodiments, the data isolator may be paired with a power isolator that is configured to transmit power across an isolation barrier. In these embodiments, the data packets may include additional bits to control operation of the power isolator. In Table 2, the bits to control operation of the power isolator are shown as pwr[0]-pwr[9].

It should be appreciated that additional bits may be added to the data packets shown in Tables 1 and 2 to incorporate additional functionality. An example of such an asymmetric packet structure with additional functionality relative to the structure of Tables 1 and 2 is shown below in Tables 3 and 4. The particular packet structure shown in Tables 3 and 4 may be employed to transmit write commands over the isolation barrier. Table 3 shows the data fields for the bits in each data pack in the sequence of 6 data packets transmitted in a first direction across the isolation barrier. Similarly, Table 4 shows the data fields for the bits in each data packet in the sequence of 6 data packets transmitted in a second direction across the isolation barrier. One data packet from each of Tables 3 and 4 may be transmitted per clock cycle. As a result, the sequence of 6 data packets in each of Tables 3 and 4 may be transmitted over 6 clock cycles.

TABLE 3

Example Packetization Scheme for Transmitting Data in a First Direction Across Isolation Barrier

| Bit | Data Packet Number | | | | | |
|---|---|---|---|---|---|---|
| # | 1 | 2 | 3 | 4 | 5 | 6 |
| 1 | txbit0 | txbit0 | txbit0 | txbit0 | txbit0 | txbit0 |
| 2 | txbit1 | txbit1 | txbit1 | txbit1 | txbit1 | txbit1 |
| 3 | cmpty | addpty | dtpty | dtpty | dtpty | dtpty |
| 4 | cm[0] | add[0] | 0 | 0 | 0 | 0 |
| 5 | cm[1] | add[1] | dt[0] | dt[4] | dt[8] | dt[12] |
| 6 | cm[2] | add[2] | dt[1] | dt[5] | dt[9] | dt[13] |
| 7 | cm[3] | add[3] | dt[2] | dt[6] | dt[10] | dt[14] |
| 8 | | add[4] | dt[3] | dt[7] | dt[11] | dt[15] |

As shown in Table 3, each of the 6 data packets includes between seven and eight bits. The first two bits of each packet (shown as txbit0 and txbit1) may be, for example, bits from the data packets shown in Table 1 above. The packet structure in Table 3 adds a series of command bits shown as cm[0]-cm[3] that issue a write command to the receiver. The target addresses for the write commands are shown as add[1]-add[4]. The data to be written may be included in dt[0]-dt[15]. Parity bits are also integrated into the data packets to enable the receiver to check the integrity of the data packets. The parity bit associated with the command bits is shown as cmpty, the parity bit associated with the address bits is shown as addpty, and the parity bits associated with the data to be written is shown as dtpty.

TABLE 4

Example Packetization Scheme for Transmitting Data in a Second, Opposite Direction Across Isolation Barrier

| Bit | Data Packet Number | | | | | |
|---|---|---|---|---|---|---|
| # | 1 | 2 | 3 | 4 | 5 | 6 |
| 1 | txbit0 | txbit0 | txbit0 | txbit0 | txbit0 | txbit0 |
| 2 | txbit1 | txbit1 | txbit1 | txbit1 | txbit1 | txbit1 |
| 3 | txbit2 | txbit2 | txbit2 | txbit2 | txbit2 | txbit2 |
| 4 | txbit3 | txbit3 | txbit3 | txbit3 | txbit3 | txbit3 |
| 5 | txbit4 | txbit4 | txbit4 | txbit4 | txbit4 | txbit4 |
| 6 | cmpty | addpty | dtpty | dtpty | dtpty | dtpty |

As shown in Table 4, each of the 6 data packets includes six bits. The first five bits of each packet (shown as txbit0-txbit4) may be, for example, bits from the data packets shown in Table 2 above. The packet structure in Table 4 adds a series of parity bits. In particular, the parity bits cmpty, addpty, and dtpty shown in Table 3 that were transmitted in a first direction across the isolation barrier, may be transmitted back across the isolation barrier in a second direction if a self-generated parity bit matches the received parity bit (e.g., because the transmission was not corrupted). If the self-generated parity bit does not match the received parity bit (e.g., because the transmission contained an error), the transmission may be stopped.

Another example of such an asymmetric packet structure with additional functionality relative to the structure of Tables 1 and 2 is shown below in Tables 5 and 6. The particular packet structure shown in Tables 5 and 6 may be employed to transmit read commands over the isolation barrier. Table 5 shows the data fields for the bits in each data pack in the sequence of 10 data packets transmitted in a first direction across the isolation barrier. Similarly, Table 6 shows the data fields for the bits in each data packet in the sequence of 10 data packets transmitted in a second direction across the isolation barrier. One data packet from each of Tables 5 and 6 may be transmitted per clock cycle. As a result, the sequence of 10 data packets in each of Tables 5 and 6 may be transmitted over 10 clock cycles.

TABLE 5

Example Packetization Scheme for Transmitting Data in a First Direction Across Isolation Barrier

| | Data Packet Number | | | | | | | | | |
|---|---|---|---|---|---|---|---|---|---|---|
| Bit # | 1 | 2 | 3 | 4 | 5 | 6 | 7 | 8 | 9 | 10 |
| 1 | txbit0 | txbit0 | txbit0 | txbit0 | txbit0 | txbit0 | txbit0 | txbit0 | txbit0 | txbit0 |
| 2 | txbit1 | txbit1 | txbit1 | txbit1 | txbit1 | txbit1 | txbit1 | txbit1 | txbit1 | txbit1 |
| 3 | cmpty | addpty | | | | | | | | |

TABLE 5-continued

Example Packetization Scheme for Transmitting Data in a
First Direction Across Isolation Barrier

| | Data Packet Number | | | | | | | | | |
|---|---|---|---|---|---|---|---|---|---|---|
| Bit # | 1 | 2 | 3 | 4 | 5 | 6 | 7 | 8 | 9 | 10 |
| 4 | cm[0] | add[0] | | | | | | | | |
| 5 | cm[1] | add[1] | | | | | | | | |
| 6 | cm[2] | add[2] | | | | | | | | |
| 7 | cm[3] | add[3] | | | | | | | | |
| 8 | | add[4] | | | | | | | | |

As shown in Table 5, each of the 10 data packets include between two and eight bits. The first two bits of each packet (shown as txbit0 and txbit1) may be, for example, bits from the data packets shown in Table 1 above. The packet structure in Table 5 adds a series of command bits shown as cm[0]-cm[3] that issue a command to the receiver (e.g., to read data). The target addresses for the commands are shown as add[1]-add[4]. Parity bits are also integrated into the data packets to enable the receiver to check the data packets. The parity bit associated with the command bits is shown as cmpty and the parity bit associated with the address bits is shown as addpty.

TABLE 6

Example Packetization Scheme for Transmitting Data in a Second,
Opposite Direction Across Isolation Barrier

| | Data Packet Number | | | | | | | | | |
|---|---|---|---|---|---|---|---|---|---|---|
| Bit # | 1 | 2 | 3 | 4 | 5 | 6 | 7 | 8 | 9 | 10 |
| 1 | txbit0 | txbit0 | txbit0 | txbit0 | txbit0 | txbit0 | txbit0 | txbit0 | txbit0 | txbit0 |
| 2 | txbit1 | txbit1 | txbit1 | txbit1 | txbit1 | txbit1 | txbit1 | txbit1 | txbit1 | txbit1 |
| 3 | txbit2 | txbit2 | txbit2 | txbit2 | txbit2 | txbit2 | txbit2 | txbit2 | txbit2 | txbit2 |
| 4 | txbit3 | txbit3 | txbit3 | txbit3 | txbit3 | txbit3 | txbit3 | txbit3 | txbit3 | txbit3 |
| 5 | txbit4 | txbit4 | txbit4 | txbit4 | txbit4 | txbit4 | txbit4 | txbit4 | txbit4 | txbit4 |
| 6 | cmpty | addpty | dtpty | dtpty | dtpty | dtpty | dtpty | dtpty | dtpty | dtpty |
| 7 | | | dt[0] | dt[2] | dt[4] | dt[6] | dt[8] | dt[10] | dt[12] | dt[14] |
| 8 | | | dt[1] | dt[3] | dt[5] | dt[7] | dt[9] | dt[11] | dt[13] | dt[15] |

As shown in Table 6, each of the 10 data packets includes between six and eight bits. The first five bits of each packet (shown as txbit0-txbit4) may be, for example, bits from the data packets shown in Table 2 above. The packet structure in Table 6 adds a series of data fields dt[0]-dt[15] that include the data that is located at the addresses specified in Table 5. Parity bits are also integrated into the data packets to enable the receiver to check the data packets. The parity bit associated with the command bits is shown as cmpty, the parity bit associated with the address bits is shown as addpty, and the parity bits associated with the data to be written is shown as dtpty.

Having described various techniques for dynamic communication across an isolation barrier in bi-directional isolators, it should be appreciated that the techniques described herein may also be applied to unidirectional data isolators. For example, the receive circuit 110 and the transmit circuit 116 may be removed from the data isolator 100. Similarly, the receive circuit 112 and the transmit circuit 114 may be removed from the data isolator 100. As a result, the techniques described herein are not limited to bi-directional data isolators.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. A bi-directional data isolator, comprising:
   an isolation barrier;
   a first circuit configured to transmit first data and a clock signal across the isolation barrier, the clock signal being configured to periodically vary between a plurality of states at a clock frequency; and
   a second circuit configured to receive the first data and the clock signal and transmit second data across the isolation barrier;
   wherein the first circuit is configured to transmit the first data at a data rate that is variable relative to the clock frequency within a range including a first ratio of the data rate to the clock frequency and a second ratio of the data rate to the clock frequency.

2. The bi-directional data isolator of claim 1, wherein the first ratio of the data rate to the clock frequency is no more than 1:1 and the second ratio of the data rate to the clock frequency is at least 2:1.

3. The bi-directional data isolator of claim 2, wherein the second ratio of the data rate to the clock frequency is at least 4:1.

4. The bi-directional data isolator of claim 1, wherein the first circuit is configured to change the data rate relative to the clock frequency within the range at least in part by changing the clock frequency.

5. The bi-directional data isolator of claim 4, wherein the clock frequency is variable within a range including a first frequency of no more than 500 kilohertz and a second frequency of at least 1 megahertz.

6. The bi-directional data isolator of claim 4, wherein the first circuit is configured to increase the data rate relative to the clock frequency at least in part by reducing the clock frequency and transmitting at least one additional bit per cycle of the clock signal.

7. The bi-directional data isolator of claim 1, wherein the first circuit is configured to transmit the first data across the isolation barrier while the clock signal is in a first state of the plurality of states and the second circuit is configured to transmit the second data across the isolation barrier while the clock signal is in a second state of the plurality of states.

8. The bi-directional data isolator of claim 1, wherein the first circuit is configured to transmit the first data and the clock signal at least in part by:
   transmitting a first clock marker indicating that the clock signal is in a first state of the plurality of states;
   after transmitting the first clock marker, transmitting the first data; and
   after transmitting the first data, transmitting a second clock marker indicating that the clock signal is in a second state of the plurality of states.

9. The bi-directional data isolator of claim 8, wherein the second circuit is configured to receive the first data while the clock signal is in the first state and transmit the second data while the clock signal is in the second state.

10. The bi-directional data isolator of claim 1, wherein the first circuit is configured to change the data rate relative to the clock frequency within the range at least in part by transmitting a variable number of data bits per cycle of the clock signal.

11. The bi-directional data isolator of claim 10, wherein the variable number of data bits per cycle of the clock signal is variable within a range including a first number of data bits that is no more than two and a second number of data bits that is at least four.

12. The bi-directional data isolator of claim 1, wherein the isolation barrier is an isolation barrier selected from the group consisting of: a capacitive isolation barrier, an optical isolation barrier, and an inductive isolation barrier.

13. A bi-directional data isolator, comprising:
   an isolation barrier;
   a first circuit configured to transmit first data and a clock signal across the isolation barrier, the clock signal being configured to periodically vary between a plurality of states at a clock frequency; and
   a second circuit configured to receive the first data and the clock signal and transmit second data across the isolation barrier;
   wherein the first circuit is configured to transmit the first data up to a data rate that is at least four times higher than the clock frequency.

14. The bi-directional data isolator of claim 13, wherein the first circuit is configured to change the clock frequency within a range.

15. The bi-directional data isolator of claim 14, wherein the first circuit is configured to change a number of bits transmitted per clock cycle within a range.

16. The bi-directional data isolator of claim 13, wherein the first circuit is configured to transmit the first data across the isolation barrier while the clock signal is in a first state of the plurality of states and the second circuit is configured to transmit the second data across the isolation barrier while the clock signal is in a second state of the plurality of states.

17. The bi-directional data isolator of claim 13, wherein the first circuit is configured to transmit the first data and the clock signal at least in part by:
   transmitting a first clock marker indicating that the clock signal is in a first state of the plurality of states;
   after transmitting the first clock marker, transmitting the first data; and
   after transmitting the first data, transmitting a second clock marker indicating that the clock signal is in a second state of the plurality of states.

18. A method of operating a bi-directional data isolator, the method comprising:
   generating a clock signal that periodically varies between a plurality of states at a clock frequency;
   transmitting, by a first circuit, the clock signal across a transformer in a first direction;
   transmitting, by the first circuit, first data across the isolation barrier in the first direction at a data rate that is variable relative to the clock frequency within a range including a first ratio of the data rate to the clock frequency and a second ratio of the data rate to the clock frequency;
   receiving, by a second circuit, the first data and the clock signal transmitted across the isolation barrier in the first direction; and
   transmitting, by the second circuit, second data across the isolation barrier in a second direction that is different from the first direction.

19. The method of claim 18, wherein the minimum ratio of the data rate to the clock frequency is no more than 1:1 and the first ratio of the data rate to the clock frequency is at least 2:1.

20. The method of claim 19, wherein the second ratio of the data rate to the clock frequency is at least 4:1.

* * * * *